United States Patent
Speare

[11] Patent Number: 6,120,220
[45] Date of Patent: Sep. 19, 2000

[54] ROTARY CUTTING TOOL

[75] Inventor: William J. Speare, Williams Bay, Wis.

[73] Assignee: Speare Tools, Inc., Williams Bay, Wis.

[21] Appl. No.: 09/295,052

[22] Filed: Apr. 20, 1999

Related U.S. Application Data

[63] Continuation-in-part of application No. 09/130,795, Aug. 7, 1998.

[51] Int. Cl.[7] .................................................. B23B 35/00
[52] U.S. Cl. ............................. 408/1 R; 408/67; 408/206; 408/209; 408/225
[58] Field of Search ............................ 408/67, 1 R, 204, 408/206, 207, 209, 225

[56] References Cited

U.S. PATENT DOCUMENTS

| | | | |
|---|---|---|---|
| 881,856 | 3/1908 | Hagstrom . | |
| 3,339,435 | 9/1967 | Heitz | 77/55 |
| 3,583,821 | 6/1971 | Shaub et al. | 408/72 |
| 4,096,964 | 6/1978 | Glick | 220/3.4 |
| 4,579,486 | 4/1986 | Damico | 408/204 |
| 4,826,367 | 5/1989 | Kandarian | 408/225 |
| 4,830,548 | 5/1989 | Kandarian | 408/1 R |
| 5,061,123 | 10/1991 | Broussard | 408/67 |
| 5,082,403 | 1/1992 | Sutton et al. | 408/68 |
| 5,167,475 | 12/1992 | Miyanaga | 408/204 |
| 5,292,210 | 3/1994 | Nowick | 408/67 |
| 5,653,561 | 8/1997 | May | 408/67 |

*Primary Examiner*—Daniel W. Howell
*Assistant Examiner*—Monica Carter
*Attorney, Agent, or Firm*—Michael Best & Friedrich LLP

[57] ABSTRACT

A cutting tool assembly which is adapted for use in combination with a drill for cutting a hole in a work piece. The assembly includes a u-shaped blade and a mandrel assembly for fixing the blade to the drill, a dust shield which surrounds the blade and a stabilizer which can be fixed adjacent the blade. In one construction, the blade includes tips which are removably connectable to a wing portion. Also, a coating of wear-resistant material may be applied to the tips so that the blade is self-sharpening during cutting operations.

32 Claims, 6 Drawing Sheets

ROTARY CUTTING TOOL

This application is a continuation-in-part of application Ser. No. 09/130,795 filed Aug. 7, 1998.

BACKGROUND OF THE INVENTION

1. Technical Field

The invention relates generally to tools for use in combination with a drill, and more particularly to hole saws.

2. Related Prior Art

It is generally known to provide a cutting tool or hole saw for use in combination with a hand-held drill or drill press. Such known hole saw designs include a generally cylindrical body having a circular cutting edge and, opposite the cutting edge, a cup or flange supporting a fixture for attachment to the drill. Various such known hole saw designs are illustrated in the 1994 Milwaukee Electric Tool Company Catalog (No. 194 at pages 22–25).

It is also know to provide various accessories for use in combination with a hole saw. For example, U.S. Pat. No. 5,292,210, which issued on Mar. 8, 1994, discloses a hole saw attached to a hand-held drill and a debris catcher surrounding the hole saw. The debris catcher collects dust and particulates created through operation of the hole saw and drill. The debris falls into the clearance provided between the chuck of the drill and the dust catcher.

SUMMARY OF THE INVENTION

One of the problems associated with such known hole saw designs is that the radius of the hole that can be formed is somewhat limited. In designs providing a circular cutting edge, the cost of materials needed to make a large diameter hole saw becomes expensive. Also, the design of known hole saws require relatively complicated fabrication techniques, the cost of fabricating the hole saw is expensive, and sharpening the hole saw is either difficult or expensive. Another problem with some hole saw designs is that the hole saw is not suitable for cutting a hole in a variety of materials. A further problem with existing hole saws is that, to cut holes of different diameters, different diameter hole saws are necessary, requiring additional cost and storage space for each hole saw.

To address these and other problems that are heretofore not well known in the art, the present invention provides a cutting tool assembly that can be used as a hole saw and that has a simple design. The cutting tool assembly has a blade configured so as to be easy to sharpen and maintain, and that can be used to cut holes in work pieces made of any of a variety of materials.

More particularly, in one embodiment, the invention provides a cutting tool assembly including a u-shaped blade. The blade has a pair of spaced-apart tips and a wing portion extending between the tips. The wing portion of the blade has rolled edges for added rigidity and strength. The tips are configured to define a leading edge, with respect to the direction of rotation of the blade, and an axial edge facing the work piece. The leading and axial edges of each tip cooperate to provide a cutting surface that engages the work piece to be cut. The cutting tool also includes a mandrel assembly adapted to be held by the chuck of a drill. The mandrel assembly includes a mandrel body that houses a drill bit. The drill bit is fixed to the mandrel by a press fit. The mandrel assembly also includes a blade mount for engaging the blade, and a lock nut for fixing the blade to the mandrel. The lock nut has a radially molded base or serrated flange.

In another embodiment of the invention, the cutting tool assembly includes a stabilizer to be used when cutting a hole in relatively thick or dense material, such as drywall material. The stabilizer is a flexible spring secured between the mandrel assembly and the wing portion of the blade, and can be detached from the cutting tool assembly. The stabilizer extends away from the wing portion of the blade on either side of the mandrel assembly and toward the work piece. After the drill bit enters the surface of the work piece, the ends of the stabilizer engage the surface of the work piece and exert pressure on the portion of the work piece material being removed by the hole saw.

In another embodiment of the invention, the cutting tool assembly includes dust shield to collect debris created by the blade. The dust shield is a bowl-shaped member made of translucent plastic and is supported on the cutting tool assembly in a manner that permits the dust shield to spin freely as the drill is operated. The dust shield is mounted on the mandrel assembly between the drill chuck and a lock nut which secures the blade. The chuck of the drill is thus protected from the debris collected by the dust shield. Also, the dust shield wraps around the blade and extends slightly beyond the blade tips to an edge which contacts the surface of the work piece. In operation, the tips of the blade contact the work piece slightly before the dust shield contacts the surface of the work piece. Thereafter, the dust shield flexes sufficiently to permit the blade to advance into the work piece while the dust shield remains in contact with the surface of the work piece.

The invention also provides a cutting blade assembly for use with a cutting tool assembly. The cutting blade assembly provides tips that a removably connectable to the wing portion so that the diameter of the hole cut by the cutting tool assembly is adjustable. Also, if necessary, a tip can be replaced. Specifically, the invention provides a pair of tips selectively connectable to the opposite ends of the wing portion, respectively, and a connecting assembly for selectively connecting the tips to the wing portion. Preferably, the tips are adjustably connectable to the wing portion so that a distance between the axis and the leading edge of each of the tips is adjustable.

Also, the connecting assembly preferably includes a slot defined in each of the opposite ends of the wing portion, a corresponding opening defined in each of the tips and alignable with the slot in the opposite end, and connecting members extending through each slot and corresponding opening to connect each of the tips to the wing portion. Each slot defines a first position and a second position for the corresponding connecting member, wherein, in the first position, the connecting member connects the tip to the wing portion so that the leading edge is a first distance from the axis, and wherein, in the second position, the connecting member connects the tip to the wing portion so that the leading edge is a second distance from the axis. In one construction, the slot defines a plurality of positions between the first position and the second position, wherein the connecting member is positionable in each of the plurality of positions so that the leading edge is a corresponding distance from the axis. In another construction, the connecting member is positionable in any position between the first position and the second position so that the distance between the leading edge and the axis is infinitely adjustable between the first distance and the second distance.

In addition, the invention provides a cutting blade assembly having self-sharpening sharp edges and a method for forming the cutting blade assembly. The cutting blade assembly includes a carbide coating applied to the outer surface of each tip. Specifically, the invention provides each tip having an inner surface and an outer surface which intersect to define the leading edge, the material of the inner surface wearing at a different rate than the material of the outer surface to sharpen the sharp surface. Preferably, the material of the inner surface wears at a faster rate than the material of the outer surface to sharpen the sharp surface. Preferably, the material of the outer surface is a carbide coating applied to the material of the tip.

The cutting tool assembly embodying the invention thus provides an easily formed and easily used instrument for cutting a hole in a sheet of material. The blade can be easily formed by punching a sheet of metal or other suitable material and bent into its final form. The cutting edges of the blade can also be easily formed by conventional methods, such as coining, and are easily sharpened as needed. Also, the cutting blade may include a carbide coating and be self-sharpening. Further, in one embodiment, the tips are removably connectable to the wing portion so the diameter of the hole cut by the cutting tool assembly is adjustable and so that a tip may be replaced, if necessary.

Other features and advantages of the invention will become apparent to those skilled in the art upon review of the following detailed description, claims and drawings.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
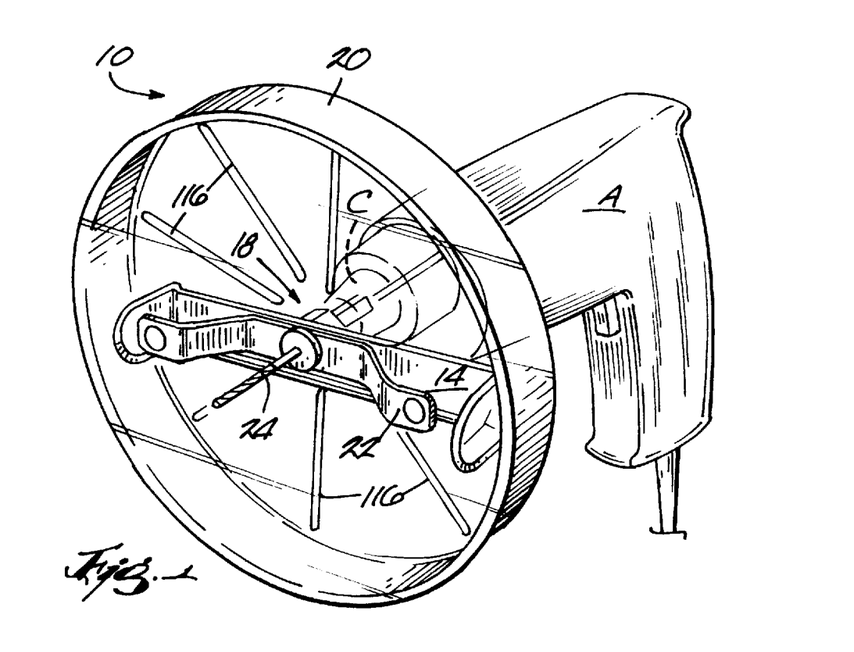
FIG. 1 is a perspective view of a cutting tool assembly which embodies the invention attached to a hand-held drill.

The drawings illustrate a cutting tool assembly 10 which is adapted for use in combination with a hand-held drill A (shown in FIG. 1) or drill press (not shown) for cutting a hole in a work piece B (shown in phantom in FIG. 3), such as a sheet of drywall material or a ceiling tile. The assembly 10 includes (FIG. 1) a u-shaped blade 14 and a mandrel assembly 18 for fixing the blade 14 to the drill A. The cutting tool assembly 10 also includes a dust shield 20 which surrounds the blade 14 and a stabilizer 22. Both the dust shield 20 and the stabilizer 22 are removably mounted on the drill A to cooperate with operation of the blade A, and both are described in detail below.

Figure 3:
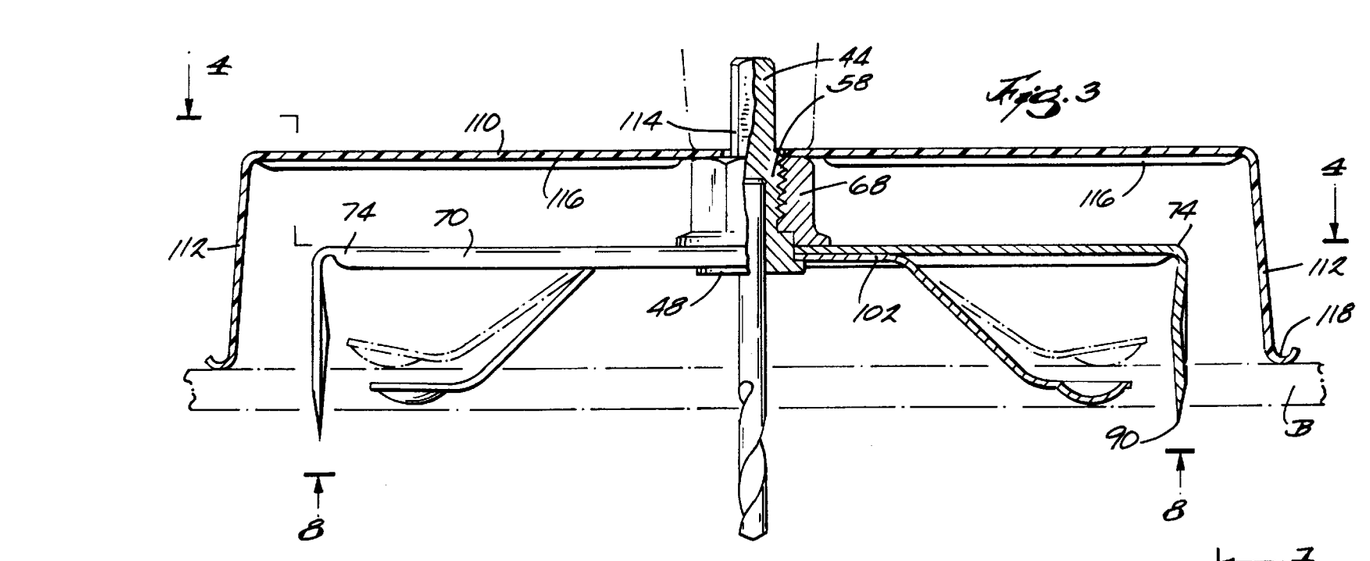
FIG. 3 is a cross-sectional view of the cutting tool assembly shown in FIG. 1.

More particularly, and with reference to FIG. 3, the mandrel assembly 18 includes a drill bit 24 having a shank 26 and a tip 30, and defines an axis of rotation 34 about which the bit 24 and blade 14 rotate when the drill A is operated.

The mandrel assembly 18 also includes (see FIGS. 5 and 6) a mandrel 38 having a body 42 which has a shank end 44 adapted to be received by the drill chuck C in a conventional manner. The end 44 has a non-round cross-section, and, preferably, the end 44 has three or, alternatively, six planar sides. In the illustrated embodiment, the end 44 is formed with a cross-section having three planar sides, but any suitable configuration could be successfully used. The body 42 also has extending therein an axially extending bore 46 that is sized to housingly receive the shank 26 of the bit 24. The mandrel 38 is fixed to the bit 24 by a press fit. The bit 24 is pressed into the mandrel shank end 44.

Figure 5:
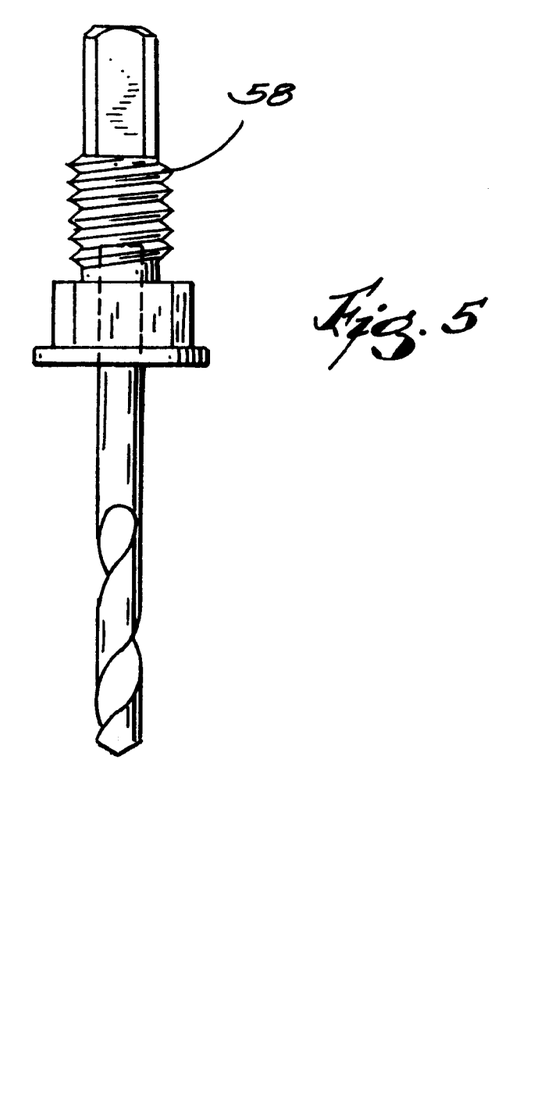
FIG. 5 is an enlarged view of a portion of the cutting tool assembly shown in FIG. 1.
Figure 6:
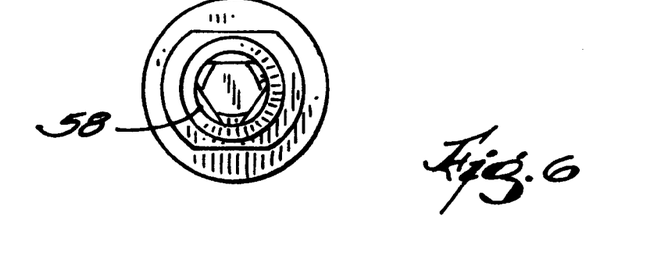
FIG. 6 is a bottom view of the portion shown in FIG. 5.
Figure 7:
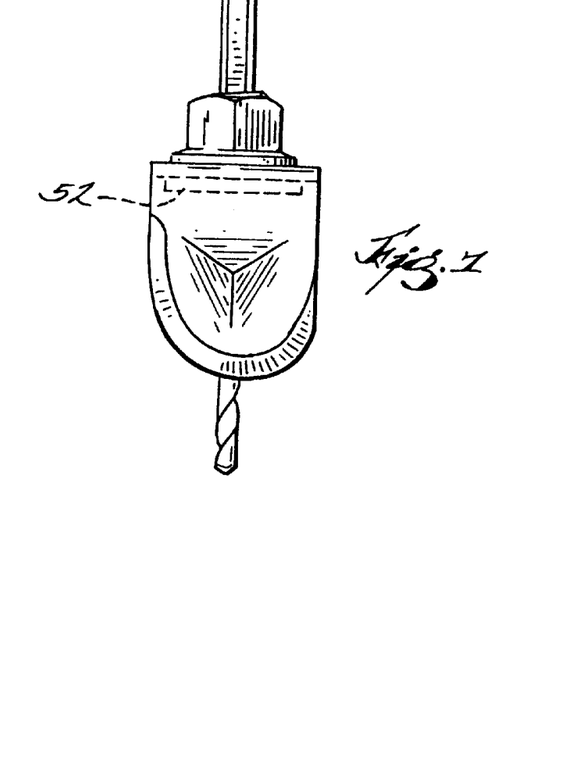
FIG. 7 is a side view of the cutting tool assembly taken along line 7—7 in FIG. 4.

The mandrel body 42 also includes a blade mount 50 to which the blade 14 and stabilizer 22 are fixed. The blade mount 50 is opposite the shank end 44 and includes a radially extending disk 52 which engages the underside of the blade 14 or the stabilizer 22, when the stabilizer is used. The blade mount 50 also includes a generally cylindrical portion 54 and defines a pair of opposite facing flats 56. In a manner discussed more particularly below, the blade 14 is supported on the disk 52 and cylindrical portion 54 such that the flats 56 engage the blade 14 and stabilizer 22 and rotationally fix the blade 14 and stabilizer 22 to the mandrel 38.

The mandrel 38 also includes a threaded portion 58 which extends between the blade mount 50 and shank end 44. The mandrel assembly 18 also includes a serrated flange lock nut 68 which is threaded onto the portion 58 of the mandrel 38. The lock nut 68 engages the upper surface of the blade 14 so as to secure the blade 14 against either the disk 52 or the stabilizer 22 and to axially fix the blade 14 relative to the mandrel assembly 18.

Figure 4:
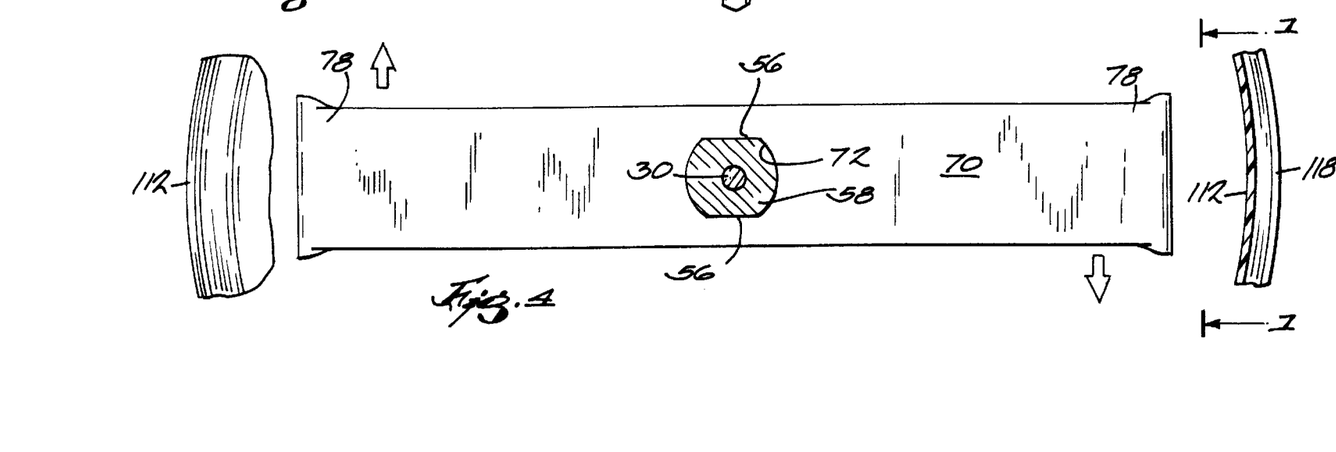
FIG. 4 is a sectional view taken along line 4—4 in FIG. 3.

The blade 14 includes (FIGS. 3 and 4) a radially extending wing portion 70 having therein a centrally located slot 72. The slot 72 is sized to be complementary with the blade mount 50, i.e., the slot 72 is elongated so as to receive and engage the flats 56 and cylindrical portion 54. When the blade 14 is fixed to the mandrel assembly 18, the slot 72 is symmetrically located about the axis 34 and the wing portion 70 extends radially perpendicular to the axis 34 between a pair of opposite ends 74. The wing portion 70 has rolled edges 76 extending between the ends 74. The edges 76 provide enhanced strength and rigidity to the blade 14. The mandrel assembly 18 may include a washer (not shown) which surrounds the mandrel body 42 and overlies the wing portion 70.

The blade 14 also includes (FIG. 3) a pair of tips 78 which extend from a respective end 74 of the wing portion 70. Each tip 78 is generally parallel to the axis 34 and generally perpendicular to the wing portion 70. While the blade 14 can be designed to cut in one or both directions of rotation about the axis 34, in the illustrated embodiment, the tips 78 are formed to cut when rotated in the clockwise direction of rotation indicated in the drawings. With respect to the desired direction(s) of rotation, each tip 78 has (FIG. 8) a leading edge 82 which is sharpened so as to provide a sharp surface for engaging the work piece B. Each tip 78 also includes an axially facing edge 86 which is also sharpened and which includes an axially extending point or apex 90 which defines the first point of contact of the blade 14 with the work piece B. As best shown in FIG. 3, the tip 30 of the drill bit 22 preferably extends axially slightly (approximately 1/8") beyond the apex 90 so as to provide a centering point for locating the tool assembly 10 relative to the work piece B.

Figure 8:
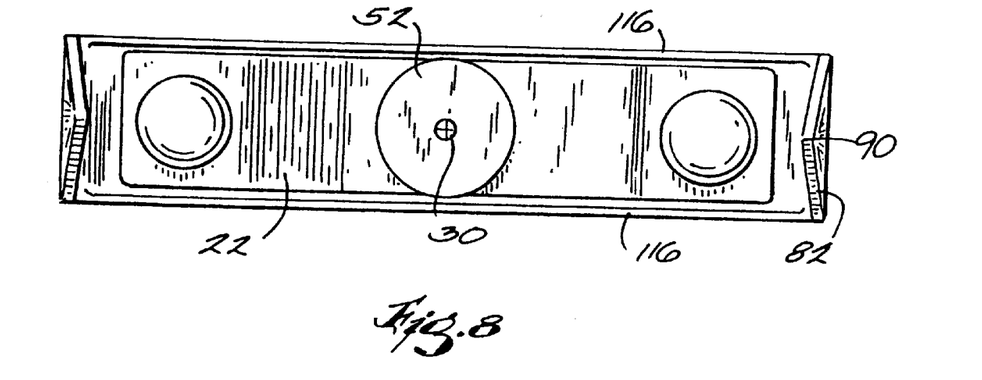
FIG. 8 is a bottom view of the cutting tool assembly taken along line 8—8 in FIG. 4.

Referring to FIG. 8, each tip 78 is formed such that, when viewed in a plane extending perpendicular to the axis 34, the central portion of the tip 78 is located radially inward of the leading edge 82. Thus, the path traced by the axial edge 86 as the blade 14 rotates about axis 34 has a radial component or width. More particularly, in the preferred embodiment, the axial length of the tip 78 is approximately 1¼" and has a radial distance of approximately 1/8" from the end of the wing portion 70 to the axial edge 86.

Figure 2:
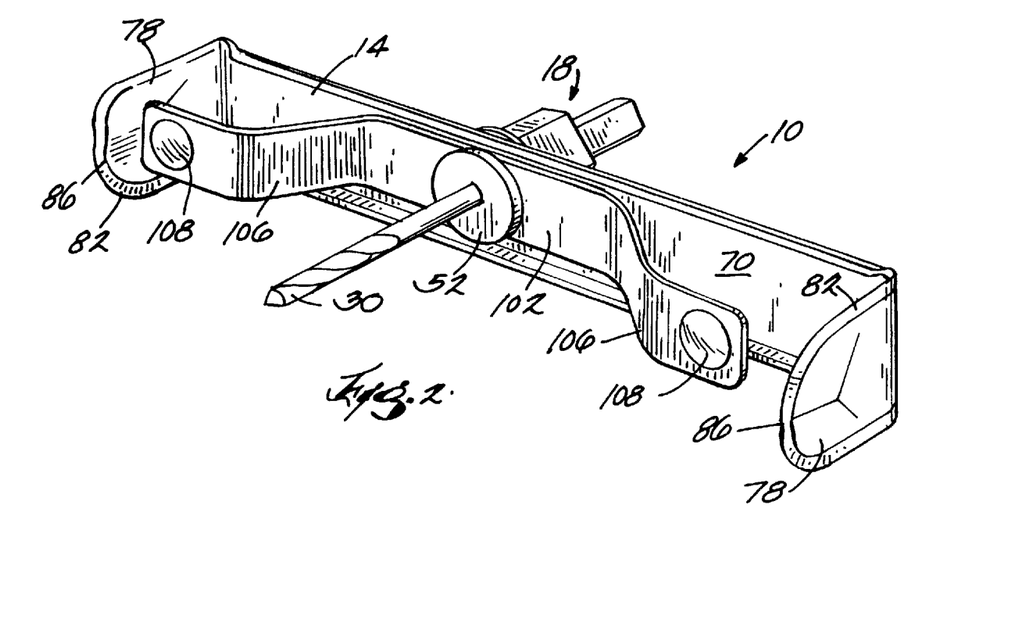
FIG. 2 is a perspective view of the cutting tool assembly shown in FIG. 1.

The tips 78 may be self-sharpening. Specifically, in one construction (see FIG. 2), each tip 78 includes a material M on the outer surface which wears more slowly than the material of the inner surface, providing a self-sharpening sharp surface on each leading edge 82. Preferably, the material M is a coating of wear-resistant material, such as a carbide coating, which is applied to the outer surface of each tip 78. As a result, during cutting operations, the material of the inner surface wears faster than the coating of material M of the outer surface, and the leading edge 82 is sharpened. In other constructions (not shown), when a more wear-resistant blade 14 is desired, the material M is applied to both the inner surface and the outer surface of each tip 78.

When the stabilizer 22 is attached to the mandrel assembly 18, the stabilizer 22 is located on and extends along the underside of the wing portion 70 between the rolled edges 76. The stabilizer 22 is preferably made of a relatively thin metal and is formed to act like a leaf spring engageable with the work piece B. More particularly, the stabilizer 22 includes central portion 102 having therein a slot 104 which aligns with the slot 72 in the blade 14. The slot 104 is also sized to be complementary with the blade mount 50, i.e., the slot is elongated so as to receive and engage the flats 56 and the cylindrical portion 54 of the blade mount 50. When the stabilizer 22 is fixed to the mandrel assembly 18, the slot 104 is symmetrically located about the axis 34. The stabilizer 22 also includes curved end portions 106 extending from a respective end of the central portion 102. Each curved portion 106 extends radially outwardly and away from the wing portion 70 of the blade 14, and generally toward a respective tip 78 of the blade 14. Each end of the stabilizer 22 includes a round detent 108 extending away from the wing portion 70 of the blade 14. The ends of the curved portions 106 are axially closer to the blade 14 than the tips 78 so that the detents 108 will engage the surface of a work piece first.

In operation, as the blade tips 78 enter the surface of the work piece B, the detents 108 on the stabilizer 22 contact the surface of the work piece B. As the blade 14 advances into the work piece B, the stabilizer 22 moves from an undeflected position (shown in FIG. 3) into a deflected position (shown in phantom in FIG. 3). The spring-like nature of the stabilizer 22 results in the stabilizer 22 exerting pressure on the portion of the work piece material being removed. This pressure on the work piece B helps maintain uniform pressure on the work piece B during cutting. Use of the stabilizer 22 is particularly helpful when the wing portion 70 of the blade 14 is long or is otherwise configured to cut a large diameter hole, or when the material being cut is a high density material, like a sheet of drywall.

The dust shield 20 is a one-piece, thin-walled member that is mounted on the mandrel assembly 18. Preferably, the dust shield is made of a clear or translucent plastic. The dust shield 20 is generally dish-shaped and includes a generally flat, disk-shaped central portion 110 and a side wall 112 extending axially from the periphery of the central portion.

A hole 114 located in the central portion 110 receives the end 44 of the mandrel body 42 so that the central portion 110 of the dust shield 20 is captured between the drill chuck C (shown in FIG. 1) and the lock nut 68. The central portion 110 has a plurality of ribs/grooves 116 that each extend radially outward like spokes from adjacent the hole 114 to the side wall 112. The side wall 112 is generally cylindrical and wraps around the blade 14 and blade tips 78. The side wall 112 extends axially just short of the blade tips 78 and terminates in a curved or rolled edge that provides a line contact with the surface of the work piece B. Preferably, and for reasons discussed below, the central portion 110 of the dust shield 20 is relatively flexible, and the side wall 112 is relatively stiff so that the edge of the dust shield 20 can engage the work piece B soon after (approximately 1/8") the blade 14 does. Thereafter, the dust shield 20 flexes sufficiently to permit the blade 14 to advance into the work piece B while the dust shield 20 remains in contact with the surface of the work piece B.

More particularly, as the edge 118 contacts the surface of the work piece B, the central portion 110 of the dust shield 20 bends back away from the blade 14, and can so deflects sufficiently to permit entire length of the blade tips 78 to be utilized.

The dust shield 20 is mounted to rotate freely on the mandrel assembly 18. During cutting operations, when the side wall 112 contacts the surface of the workpiece B, the dust shield 20 does not rotate with the mandrel assembly 18 but stays stationary against the workpiece B. This allows dust to be collected and retained by the dust shield 20.

The assembly 10 is assembled as follows: the bit 24 is housed within the mandrel body 42 and fixed into position by a press fit. The stabilizer 22 is placed on the blade mount 50, then the blade 14 is placed on the blade mount 50 over the stabilizer 22. The blade 14 and stabilizer 22 are then locked into place by threading the lock nut 68 onto the threaded portion 58 of the mandrel 38. The dust shield 20 is placed on the shank 26 of the bit 22. The shank end 44 of the mandrel 38 can then be placed into the chuck C of the drill A thereby engaging the dust shield 20 between the lock nut 68 and the drill chuck C.

Figure 9:
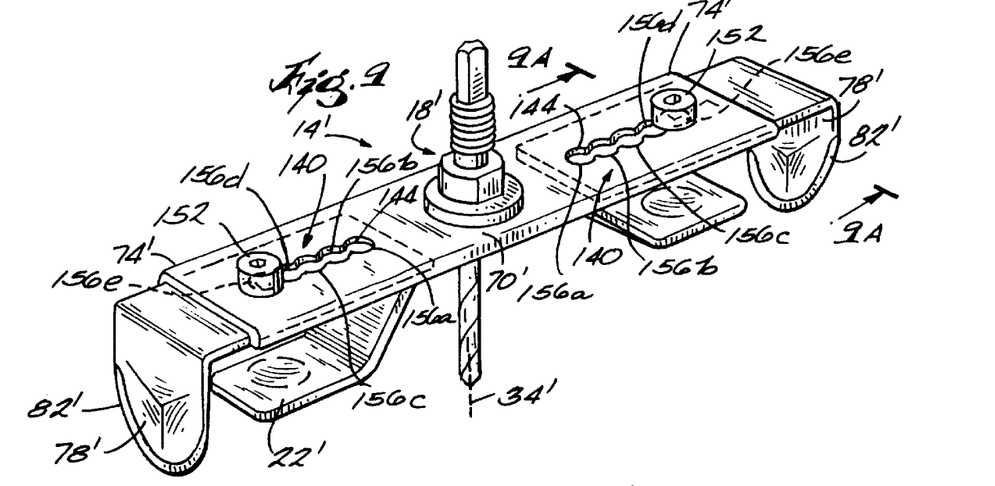
FIG. 9 is a perspective view of an embodiment of a cutting blade assembly for a cutting tool assembly.
Figure 9A:
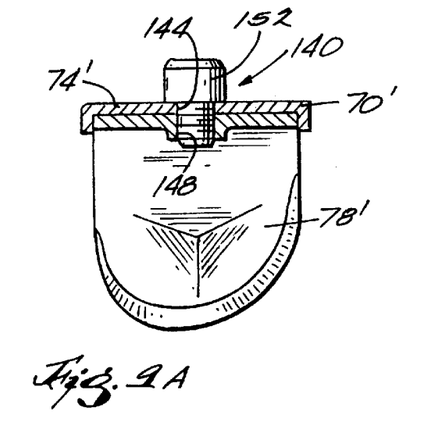
FIG. 9A is a partial cross-sectional view taken generally along line 9A—9A in FIG. 9.

FIGS. 9 and 9A illustrate another embodiment of a cutting blade assembly 14" for use with a cutting tool assembly 10". Common elements are identified by the same reference numbers "'".

The cutting blade assembly 14' includes a wing portion 70' having opposite ends 74'. A pair of tips 78' are removably connectable to respective ends 74' of the wing portion 70' so that the diameter of the hole cut by the cutting tool assembly 10' is adjustable and so that a tip 78' may be replaced, as necessary.

The cutting blade assembly 14' also includes a connecting assembly 140 for selectively connecting the tips 78' to the wing portion 70'. The connecting assembly 140 includes a channel or slot 144 defined in each end 74' of the wing portion 70', a corresponding tapped hole or opening 148 defined in each tip 78' and connecting members or fasteners 152 for connecting the tips 78' to the respective ends 74' of the wing portion 70'. As shown in FIG. 9A, the fastener 152 extends through the slot 144 and threads into the corresponding opening 148 to connect the tip 78' to the wing portion 70'. In other constructions (not shown), the opening 148 may not be tapped, and a nut may be provided to secure the fastener 152.

In the construction shown in FIGS. 9 and 9A, each slot 144 defines a plurality of positions 156*a–e* in which the corresponding fastener 152 is positionable. When the fastener 152 is positioned in one of the positions (i.e., 156*a*), the leading edge 82' of the tip 78' is a corresponding distance from the axis 34' so that the cutting blade assembly 14' has a corresponding diameter and cuts a hole of a given diameter. When the fastener 152 is moved to another position (i.e., 156*e*), the leading edge 82' is a different distance from the axis 34' so the cutting blade assembly 14' cuts a hole of a different diameter. The fastener 152 is positionable in each of the positions 156*a–e* so that the cutting blade assembly 14' cuts holes of corresponding different diameters.

Figure 10:
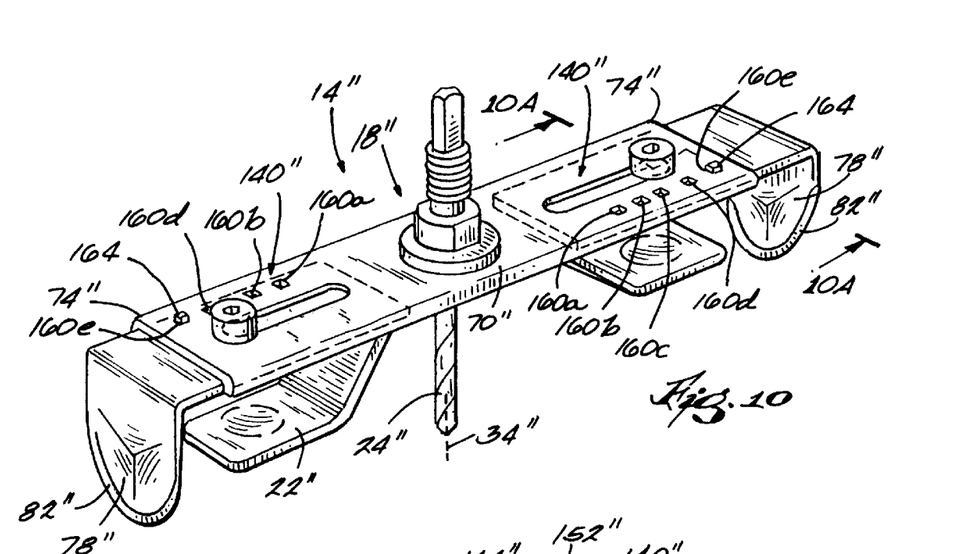
FIG. 10 is a perspective view of another embodiment of the cutting blade assembly shown in FIG. 9.
Figure 10A:
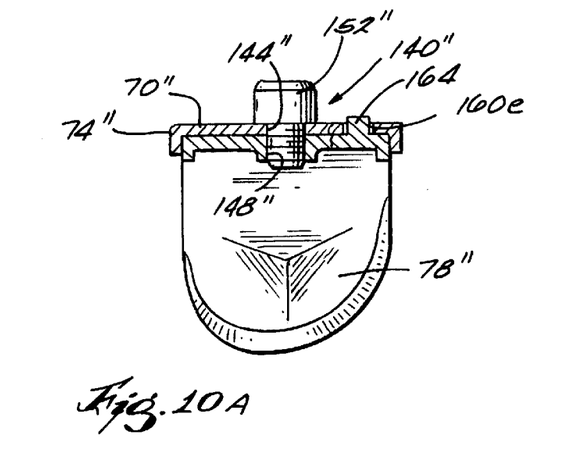
FIG. 10A is a partial cross-sectional view taken generally along line 10A—10A in FIG. 10.

FIGS. 10 and 10A illustrate another construction of a cutting blade assembly 14" similar to that shown in FIG. 9. Common elements are identified by the same reference number '"'.

In this construction, each slot 144" does not define specific positions for the fastener 152". Instead, the connecting assembly 140" also includes position holes 160*a–e* defined in the wing portion 70' in proximity to each slot 144". Corresponding position tabs 164 are defined on each tip 78". When the position tab 164 is positioned in one of the position holes (i.e., 160*a*), the leading edge 82" of the tip 78" is a corresponding distance from the axis 34" so that the cutting blade assembly 14" has a corresponding diameter and cuts a hole of a given diameter. When the position tab 164 is positioned in another position hole (i.e., 160*e*), the leading edge 82" is a different distance from the axis 34" so the cutting blade assembly 14" cuts a hole of a different diameter. The position tab 164 is positionable in each of the position holes 160*a–e* so that the cutting blade assembly 14" cuts holes of corresponding different diameters.

In another construction (not shown), the position holes 160*a–e* and the position tab 164 could be combined with the slot 144" having defined positions 156*a–e* to provide greater stability when the tip is connected to the wing portion.

In yet another construction (not shown), each slot does not define specific positions (i.e., 156*a–e*) for the fastener, and the connecting assembly does not include position holes (i.e., 160*a–e*) and the position tab (i.e., 164). In such a construction, the fastener is positionable in the slot so that the diameter of the cutting blade assembly and the diameter of the hole cut by the cutting blade assembly is infinitely adjustable between a minimum (fastener positioned adjacent the inner edge (i.e., position 156*a*) of the slot) and a maximum (fastener positioned adjacent the outer edge (i.e., position 156*e*) of the slot).

The tool assembly 10 thus provides an easily made and easily used instrument for cutting a hole in a sheet of material. It will be readily apparent that the blade 14 can be made of various lengths for the cutting of different sized holes, and that the position of the leading edge 82 of the blade 14 relative to the axis 34 defines the radius of the hole formed by using the tool 10. Further, in one construction, the position of the leading edge 82" relative to the axis 34" is adjustable so that the radius of the hole formed using the cutting tool 10" is adjustable.

The blade 14, 14' or 14" can be easily formed by punching a sheet of metal or other suitable material and bent into its final form. The cutting edges of the blade 14, 14' or 14" can also be easily formed by conventional methods, such as coining, and are easily sharpened as needed. Further, in any of the embodiments, the blade 14, 14' or 14" may include a coating formed on the outer surface of the tip so that the blade is self-sharpening during cutting operations.

Various other features of the invention are set forth in the following claims.

What is claimed is:

1. A cutting tool assembly adapted for use with a drill for cutting a hole in a work piece, the assembly comprising:
   a u-shaped blade including a wing portion having therein a centrally located slot;
   a dust shield surrounding the blade;
   a stabilizer including a central portion having therein a slot which aligns with the slot in the blade; and
   a mandrel assembly supporting the blade and adapted to be fixed to the drill, the mandrel assembly including a blade mount to which the blade and stabilizer are fixed, the blade mount being received in the slot in the wing portion, the blade mount including a radially extending disk which engages the blade and the stabilizer, a generally cylindrical portion, and a pair of opposite facing flats, the mandrel assembly also including a threaded portion which extends between the blade mount and a shank end.

2. A cutting tool assembly as set forth in claim 1 wherein the stabilizer also includes curved end portions extending from respective ends of the central portion and a detent in the end of each of the curved portions.

3. A cutting tool assembly as set forth in claim 1 wherein the mandrel assembly includes a drill bit having a shank and a tip.

4. A cutting tool assembly as set forth in claim 3 wherein the mandrel assembly includes a body having a shank end adapted to be fixed to the drill, the shank end being formed with a non-round cross-section, the mandrel body also having extending therein an axially extending bore that is sized to housingly receive the shank of the bit.

5. A cutting tool assembly as set forth in claim 1 wherein the mandrel assembly also includes a lock nut which is threaded onto the threaded portion of the mandrel body.

6. A cutting tool assembly as set forth in claim 1 wherein the blade includes a pair of tips which extend from respective ends of the wing portion.

7. A cutting tool assembly as set forth in claim 6 wherein each of the tips has a leading edge which is sharpened so as to provide a sharp surface for engaging the work piece, and wherein each of the tips also includes an axially facing edge which contacts the work piece.

8. A cutting tool assembly as set forth in claim 7 wherein each of the tips has a central portion that is located radially inward of the leading edge.

9. A cutting tool assembly as set forth in claim 1 wherein the dust shield is a one-piece, thin-walled member that is mounted on the mandrel assembly.

10. A cutting tool assembly as set forth in claim 1 wherein the dust shield is mounted on the mandrel assembly and is freely rotatable relative to the mandrel assembly.

11. A cutting tool assembly as set forth in claim 1 wherein the dust shield is made of a clear or translucent plastic.

12. A cutting tool assembly as set forth in claim 1 wherein the dust shield includes a generally flat, disk-shaped central portion and a side wall extending axially from the periphery of the central portion.

13. A cutting tool assembly as set forth in claim 1 wherein the mandrel assembly includes a body having a shank end adapted to be fixed to the drill, and wherein the dust shield includes central portion, a side wall extending axially from the periphery of the central portion, and a hole that is located in the central portion and that receives the shank end of the mandrel body.

14. A cutting tool assembly as set forth in claim 13 wherein the central portion has a plurality of grooves that each extend radially outward from adjacent the hole to the side wall.

15. A cutting tool assembly as set forth in claim 13 wherein the side wall extends axially and terminates in a curved or rolled edge.

16. A cutting tool assembly adapted for use with a drill for cutting a hole in a work piece, the assembly comprising:
   a u-shaped blade;
   a mandrel assembly supporting the blade and adapted to be fixed to the drill; and
   a stabilizer including a central portion having opposite ends, the central portion having therein a slot which receives the mandrel assembly and having curved end portions, each extending from a respective end of the central portion of the stabilizer, and a detent in the end of each of the curved end portions.

17. A cutting blade assembly for use with a cutting tool assembly, the cutting assembly adapted for use with a drill for cutting a hole in a work piece, the cutting blade assembly comprising:
   a wing portion having opposite ends;
   a pair of tips selectively connectable to the opposite ends of the wing portion, respectively, each of the tips having a leading edge providing a sharp surface for engaging the work piece; and
   a connecting assembly for selectively connecting the tips to the wing portion.

18. The cutting blade assembly as set forth in claim 17 wherein, to cut the work piece, the cutting blade assembly is rotatable about an axis, and wherein the tips are adjustably connectable to the wing portion so that a distance between the axis and the leading edge of each of the tips is adjustable.

19. The cutting blade assembly as set forth in claim 18 wherein the connecting assembly includes a slot defined in each of the opposite ends of the wing portion, a corresponding opening defined in each of the tips and alignable with the slot in the opposite end, and connecting members extending through each slot and corresponding opening to connect each of the tips to the wing portion.

20. The cutting blade assembly as set forth in claim 18 wherein each slot defines a first position and a second position for the corresponding connecting member, wherein, in the first position, the connecting member connects the tip to the wing portion so that the leading edge is a first distance from the axis, and wherein, in the second position, the connecting member connects the tip to the wing portion so that the leading edge is a second distance from the axis.

21. The cutting blade assembly as set forth in claim 20 wherein the connecting member is positionable in any position between the first position and the second position so that the distance between the leading edge and the axis is infinitely adjustable between the first distance and the second distance.

22. The cutting blade assembly as set forth in claim 20 wherein the slot defines a plurality of positions between the first position and the second position, wherein the connecting member is selectively positionable in each of the plurality of positions so that the leading edge is a corresponding distance from the axis.

23. The cutting blade assembly as set forth in claim 20 wherein the connecting assembly further includes a plurality of position holes defined adjacent each slot and a position tab formed on each tip, the position tab being selectively positionable in each of the position holes so that the leading edge is a corresponding distance from the axis.

24. The cutting blade assembly as set forth in claim 17 wherein each tip having an inner surface and an outer surface which intersect to define the leading edge, the inner surface being formed of a material and the outer surface being formed of a material, the material of the inner surface wearing at a different rate than the material of the outer surface to sharpen the sharp surface.

25. A cutting blade assembly for use with a cutting tool assembly, the cutting tool assembly being adapted for use with a drill for cutting a hole in a work piece, the cutting blade assembly comprising:
   a wing portion having opposite ends; and
   a pair of tips connected to respective opposite ends of the wing portion, each tip having an inner surface and an outer surface which intersect to define a leading edge, the leading edge providing a sharp surface for engaging the work piece, the inner surface being formed of a material and the outer surface being formed of a material, the material of the inner surface wearing at a different rate than the material of the outer surface to sharpen the sharp surface.

26. The cutting blade assembly as set forth in claim 25 wherein the material of the inner surface wears at a faster rate than the material of the outer surface to sharpen the sharp surface.

27. The cutting blade assembly as set forth in claim 25 wherein one of the material of the inner surface and the material of the outer surface is a carbide coating applied to material forming the tip.

28. The cutting blade assembly as set forth in claim 27 wherein the material of the outer surface is a carbide coating applied to the material of the tip.

29. The cutting blade assembly as set forth in claim 25 wherein the tips are connectable to the opposite ends of the wing portion, and wherein the cutting blade assembly further comprises a connecting assembly for selectively connecting the tips to the wing portion.

30. A method of forming a cutting blade for use with a cutting tool assembly, the cutting tool assembly being adapted for use with a drill for cutting a hole in a work piece, the method comprising:
   forming a cutting blade assembly including a wing portion having opposite ends, and a pair of tips connected to respective opposite ends of the wing portion, each tip having an inner surface and an outer surface which intersect to define a leading edge, the leading edge providing a sharp surface for engaging the work piece, the inner surface being formed of a material and the outer surface being formed of a material, the material of the inner surface wearing at a different rate than the material of the outer surface to sharpen the sharp surface; and
   applying a coating to one of the inner surface and the outer surface of the tip so that the inner surface wears at a different rate than the outer surface to sharpen the leading edge.

31. The method as set forth in claim 30 wherein applying a coating includes applying the coating to the outer surface so that the inner surface wears at a faster rate than the outer surface.

32. The method as set forth in claim 30 wherein forming the cutting blade assembly includes coining the tip to form the sharp surface.

* * * * *